United States Patent Office 3,047,958
Patented Aug. 7, 1962

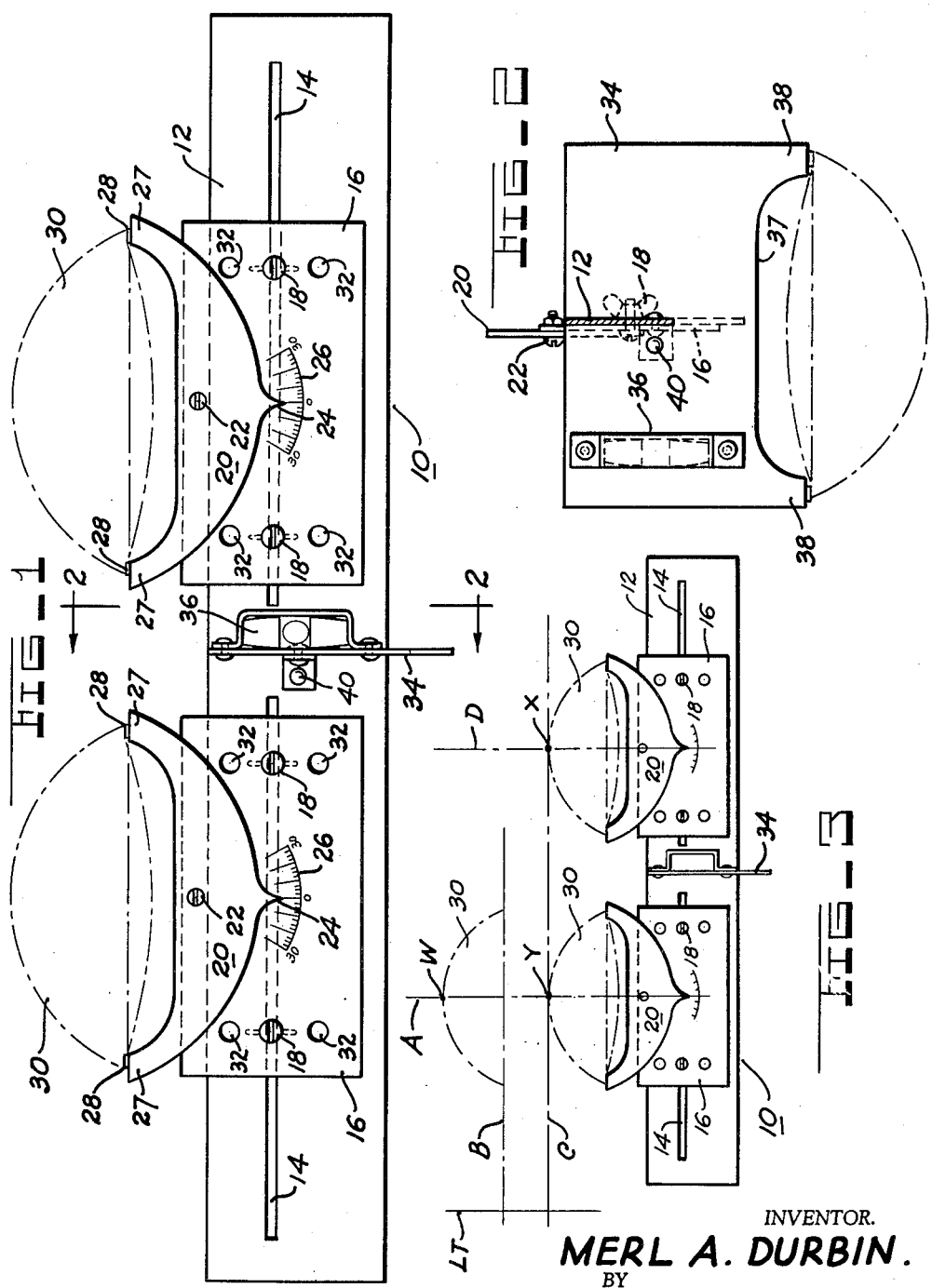

3,047,958
HEADLITE ADJUSTING DEVICE
Merl A. Durbin, 709 26th St., South Bend, Ind.
Filed Dec. 10, 1959, Ser. No. 858,628
1 Claim. (Cl. 33—180)

This invention relates to aiming of projection lamps and more particularly to an apparatus for aiming projection lamps of the type which includes a combined light source and optical means for controlling the direction or distribution of light rays emanating from the source.

This invention is especially well suited for correcting the alignment of automotive vehicle headlamps. The vehicle lighting art has progressed in recent years to a high degree of development providing, in general, lamps of high efficiency, high candlepower, long life, and relatively low cost. Noteworthy in this respect are the lamps now known in the art as the sealed beam lamps such as the all glass and the composite types. My invention provides a means for correctly aligning this type of lamp.

In projection lamps commercially available, even those representing the best presently known manufacturing techniques, there has remained the problem of ensuring accurate and simple directional control or aiming of the projected light beam. In vehicle headlamps the effect sought to be achieved, in general, is the adequate illumination of the roadway so that the operator may observe road conditions sufficiently far in advance, even at high speeds, to adjust the vehicle operation accordingly. However, it is equally important to safe vehicle operation that the light directivity and intensity be such that the operator of an oncoming vehicle is not blinded. Thus, with vehicle lamps of the candlepower necessary for adequate roadway illumination, very accurate directional control of the light beam is imperative.

There have been numerous approaches in the prior art to the solution of the problem of aiming vehicle headlamps. These may be characterized generally as either optical aiming or geometrical aiming. In optical aiming the lamp is mounted on the vehicle and illuminated; the light beam is directed upon a simple, remotely located aiming screen or a more complex optical equivalent and the beam pattern is positioned by directional adjustment of the lamp. Optical aiming of this type has proved to be disadvantageous because it requires elaborate equipment. It is, however, quite accurate because the projected light beam itself is aimed.

In geometrical aiming, the lamp is mounted on the vehicle and the lamp structure is directionally adjusted with reference to the straight-ahead direction, that is the longitudinal axis of the vehicle. Geometrical aiming is highly advantageous in that the aiming apparatus required is usually simple and inexpensive. The aiming may be performed quickly and without the necessity of large space. With my invention we pre-suppose the existence of a known relation between the projected light beam direction and the several axes of the lamp structure. This is true in the aforementioned "sealed beam" type of lamp.

It is the principal object of my invention to provide a relatively simple apparatus for effecting the geometric aiming of one or more of the sealed beam type of lamps of a bank of such lamps on an automotive vehicle; said lamps being adjustably mounted as set forth below. Many of the automotive vehicles of the day have a bank of sealed beam lamps, or so-called headlites, mounted at each side of the front end of said vehicle; and with the operation of the adjusting unit constituting my invention each lamp as a unit is angularly movable, both horizontally about a vertically extending axis, and in a vertically extending plane about a horizontally extending axis said vertically extending axis lying in the juncture of two planes, one of which is parallel to a vertically extending plane through which passes the longitudinal axis of the vehicle, and the other plane being normal to the latter plane and parallel or substantially parallel to the transverse plane of the vehicle. The aforementioned horizontally extending axis lies in said other plane.

It is a further object of my invention to provide a simple and compact instrument operable, to correctly position the sealed beam projection lamps of a bank of said lamps on an automotive vehicle, by angularly adjustably moving one or more of said lamps about certain vertically and transversely extending axes.

It is an additional object to provide an aiming instrument which is compact, inexpensive to manufacture, simple to operate, and which is adapted for use in vehicle service stations which are not equipped with elaborate aiming facilities.

Other objects and advantages of the invention will become readily apparent from the following detailed description taken in connection with the drawings in which:

FIGURE 1 is a plan view of the headlite adjusting device constituting my invention;

FIGURE 2 is a sectional view, taken on the line 2—2 of FIGURE 1 and rotated counterclockwise 90°, disclosing certain details of that part of my device which serves to adjust the headlites when they are moved in a vertically extending plane; and FIGURE 3 is a diagrammatic view disclosing my adjusting device positioned, that is ready for operation, alongside a bank of automotive headlites; and also disclosing the relative positions of certain planes, with respect to which said headlites move when they are being correctly positioned.

There is disclosed in FIGURE 1 of the drawings a preferred embodiment of the headlite testing instrument constituting my invention. This instrument, indicated as a whole by the reference numeral 10, includes an elongated rectangular shaped base member 12 of steel or other suitable material provided with spaced apart slots 14 extending lengthwise of said member. Spaced apart rectangular shaped plates 16, mounted for lateral adjustment on the base member by fastening members 18, constitute parts of two part indicator members the other part of said members constituting crescent shaped indicator parts 20 pivotally mounted on the plates 16 at 22. Each indicator member thus includes two parts, the supporting part 16 and the crescent shaped part 20 mounted thereon. The indicator parts 20 are each provided with a point 24 which, with an angular movement of the part 20 with respect to the support part 16, traverses a scale 26 embedded or otherwise secured to said support part. In one of the operative positions of the parts of the mechanism the pointer 24 is aligned with the zero mark on the support member 16.

As is disclosed in FIGURE 1 the upper foot like ends 27 of each of the indicator members 20 are adapted to contact the circular rim 28 of a so-called sealed beam projection lamp 30. Of the cars of the day many are provided with banks of two of these sealed beam lamps, one bank being positioned on each side of the front end of the vehicle. No claim is made to the lamp per se. My invention is limited to an instrument, that is the unit 10 of FIGURE 1, for correctly positioning the above mentioned lamp of each bank of lamps. However at this juncture it is to be particularly noted, as a feature of my invention, that the aforementioned lamps of the day are adjustably mounted so that each is angularly movable horizontally, by means not shown, about a vertically extending axis which lies in the juncture of two planes, one plane being parallel to a vertically extending plane through which passes the longitudinal axis of the vehicle, and the other plane being normal to the latter plane; furthermore, each lamp, by means not shown, is adjustable angularly as a unit and in a vertically extending plane, about a horizontally extending axis which lies in said aforementioned other plane. It is to be noted that the sealed beam lamps and their mounting as described above are not claimed herein per se; for my invention is limited to a particular instrument for aligning said lamps so mounted.

The aforementioned mounting of the two lamps is diagrammatically disclosed in FIGURE 3 of the drawings in which the two juxtaposed lamps 30 of each bank of lamps are adjustably pivotally mounted to angularly move in a horizontal plane about vertically extending axes X and Y. The axis Y lies in the juncture of planes A and C, plane A being parallel to a vertically extending plane LT through which passes the longitudinal axis of the vehicle, and plane C being normal to the plane A; likewise axis X lies in the juncture of planes D and C, plane D being parallel to plane A.

Sometimes it is desirable, in the sealed beam lamps of the day, to mount one of a plurality of said lamps a short distance to the rear of the other lamp or lamps in the fore and aft relationship of the lamps of the bank. With my invention this is accomplished by the placement of openings 32 in the support plates 16 making possible, with the cooperation of the fasteners 18 and slot 14, the desired fore and aft placement of said plate. Referring to FIGURE 3 illustrating this feature the lamp 30, indicated by dot and dash lines in its rearward position with respect to the other lamp, is angularly movable about a vertically extending axis W which is of course parallel to the axis Y.

As set forth in the objects of my invention each lamp is adjustable angularly in a vertically extending plane about a horizontally extending axis which lies in a plane which is normal to a vertically extending plane through which passes the longitudinal axes of the vehicle. Now the feature of my instrument 10 which correctly positions the lamp 30 about said horizontally extending axis lies in a centrally located generally rectangularly shaped plate 34, FIGURE 2, which is slotted to fit over the base plate member 12 and detachably secured to said plate by fastening means 40. The plate 34 preferably lies in a plane which is normal to the plane of the base plate 12; and to the plate 34 is secured a spirit level 36 of the type used in a carpenter's level. One side of the plate 34, that is the side remote from the indicator members 20, is recessed at 37 to provide relatively narrow foot members 38 adapted to contact the rim of the lamp 30 when the plate 34 with its spirit level 36 is being used.

Describing now the operation of my invention the instrument 10 is positioned alongside the two lamps disclosed in FIGURE 1 so that the plane of the base plate 12 is normal to the vertically extending plane through which passes the longitudinal axis of the vehicle, that is the base plate is held against the lamp in a plane which is parallel or substantially parallel to the transverse plane of the vehicle. The foot portions 27 of the indicator members 20 are in this operation then moved into contact with the rims 28 of the lamps and if said lamps are misaligned angularly about the vertical axes X and Y, FIGURE 3, then the pointers 24 will be out of registry with the zero marks on the scales 26. The attendant making the test will then adjust the lamps so that said pointers will register with the zero marks.

To check the position of the lamps in the vertical plane the attendant will turn the instrument 10 around 180° and position the foot portions 38, FIGURE 2, against the rim of the lamp being tested. If the spirit level 36 indicates that the lamp is misaligned in the vertical plane then the attendant will adjust the lamp until the spirit level indicates that the plane of the rim 28 is normal to any one of the aforementioned vertically extending planes LT, A and D of FIGURE 3.

There is thus provided a simple but practical instrument of relatively few parts quickly operable to correctly position the several sealed beam projection lamps of a bank of said lamps on an automotive vehicle; to thereby effect an accurate directional control of the light beam of said lamps.

I claim:

An instrument operative to facilitate the correction of alignment of a bank, that is plurality, of juxtaposed sealed beam lamps of an automotive vehicle, each lamp being angularly and adjustably movable horizontally about a vertically extending axis which axis lies in the juncture of two planes, one parallel to a vertically extending plane through which passes the longitudinal axis of the vehicle, and the other normal to the latter plane; and each lamp being angularly and adjustably movable, as a unit and in a vertically extending plane, about a horizontally extending axis which lies in said other plane; said instrument including an elongated base member and a plurality of spaced apart lamp encompassing indicator parts each part being pivotally mounted on one of a plurality of indicator parts adjustably secured to the base member the latter lying, when the instrument is being used, contiguous to the aforementioned bank of lamps and in a plane which is normal to the aforementioned vertically extending plane, said indicator parts of the base member being adjustably mounted for lateral movement on a relatively long and narrow portion of the base member and each of said indicator parts having means establishing selective distances therefor in the fore and aft direction from an axis of said base member parallel to said lateral movement.

References Cited in the file of this patent

UNITED STATES PATENTS

| | | |
|---|---|---|
| 1,838,226 | Jenkins | Dec. 29, 1931 |
| 1,847,652 | Jenkins | Mar. 1, 1932 |
| 1,985,393 | Zwiercan | Dec. 25, 1934 |
| 2,337,502 | Scott | Dec. 21, 1943 |
| 2,598,794 | Holmes | June 3, 1952 |
| 2,609,611 | Dickson | Sept. 9, 1952 |
| 2,867,910 | Falge | Jan. 13, 1959 |
| 2,887,779 | Hearn | May 26, 1959 |